No. 666,626. Patented Jan. 22, 1901.
H. B. & B. L. McNULTY.
COMPUTING SCALE.
(Application filed July 31, 1900.)
(No Model.) 2 Sheets—Sheet 1.
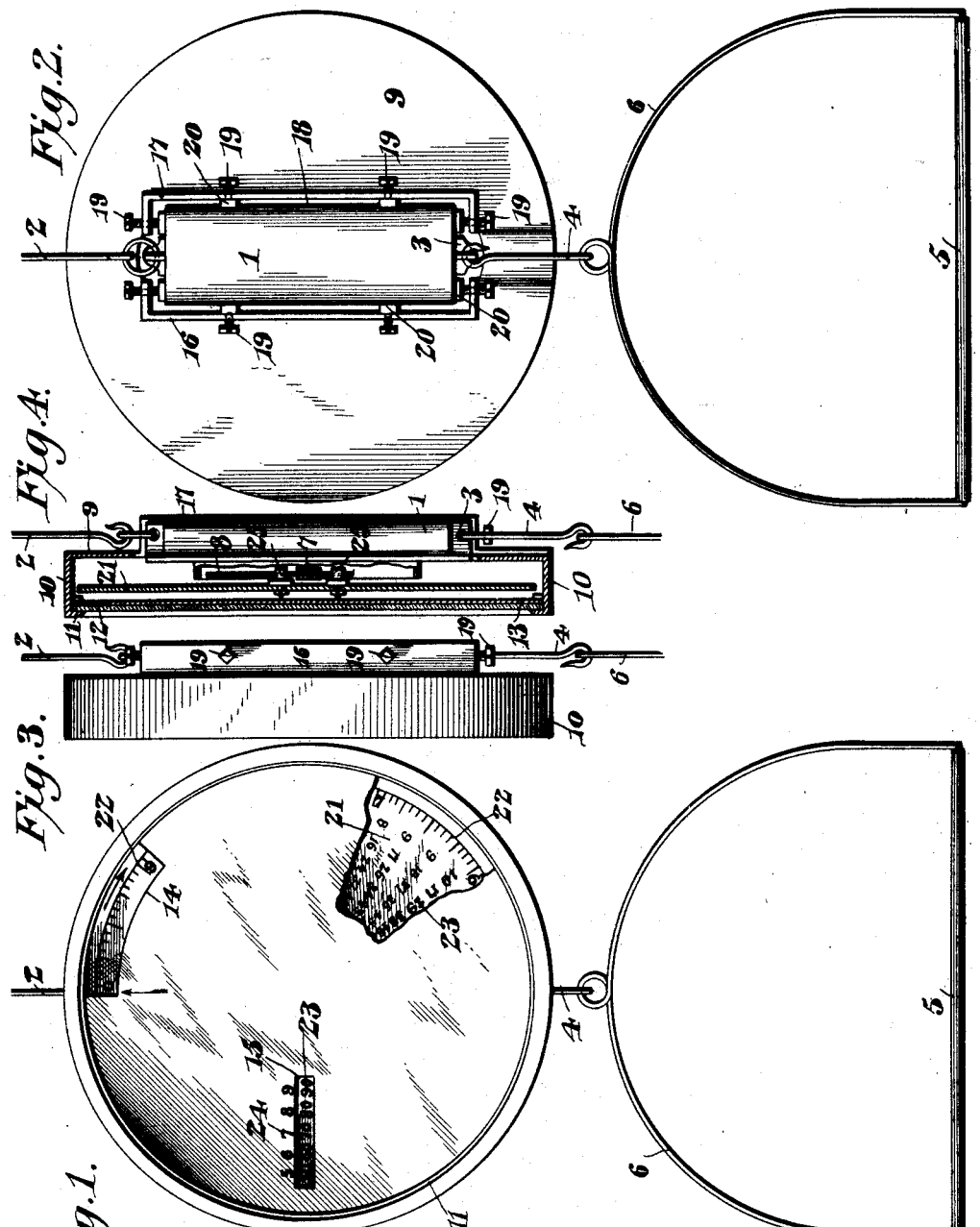

No. 666,626. Patented Jan. 22, 1901.
H. B. & B. L. McNULTY.
COMPUTING SCALE.
(Application filed July 31, 1900.)
(No Model.) 2 Sheets—Sheet 2.
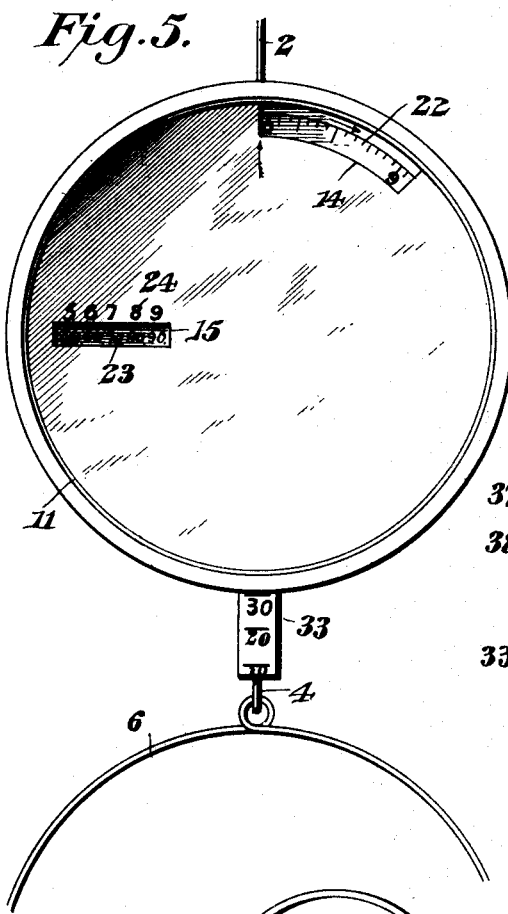
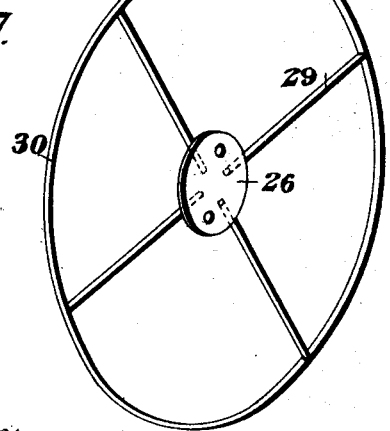
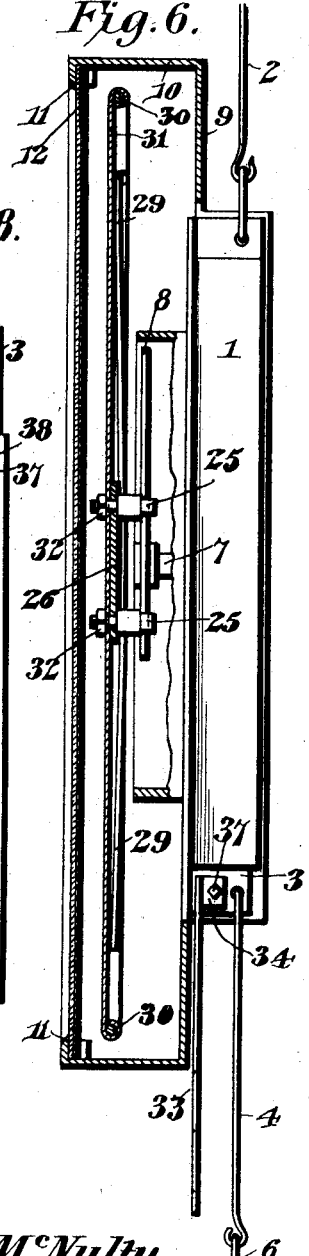
B. L. McNulty
H. B. McNulty Inventors

UNITED STATES PATENT OFFICE.

HARRY B. McNULTY AND BENJAMIN L. McNULTY, OF WASHINGTON, DISTRICT OF COLUMBIA, ASSIGNORS TO GEORGE P. CHASE AND CHARLES W. DARR, OF SAME PLACE.

COMPUTING-SCALE.

SPECIFICATION forming part of Letters Patent No. 666,626, dated January 22, 1901.

Application filed July 31, 1900. Serial No. 25,463. (No model.)

*To all whom it may concern:*

Be it known that we, HARRY B. MCNULTY and BENJAMIN L. MCNULTY, citizens of the United States, residing at Washington, in the District of Columbia, have invented a new and useful Computing-Scale, of which the following is a specification.

The provision of price-computing mechanism for scales of various characters has heretofore involved a reorganization of the scale structure, necessitating the purchase of a new and comparatively expensive scale by those desiring a weighing instrument adapted to automatically compute the price of the article or substance weighed at any given price per pound or other unit of weight. This reorganization of the scale structure and the permanent incorporation therewith of the price-computing mechanism has removed the computing-scale from the reach of a large class of merchants unable or unwilling to incur the expense of a new weighing instrument of complicated construction for the sole purpose of securing the automatic computation of price of the substances to be sold.

One object of the present invention, therefore, is to provide a simple and inexpensive computing attachment designed to be readily attached to ordinary forms of scales already in use without necessitating the slightest change of the scale structure and without interfering with the accurate adjustment of the balance or weighing mechanism, which is necessarily taxed to some slight degree by its operative connection with the computing mechanism to cause the latter to indicate the total value of any given number of pounds at any given price per pound.

To the accomplishment of this object—that is to say, the production of a computing device or attachment which may be readily applied to scales now in use without special adaptation of the latter—our present invention consists in attaching a computing-dial upon the indicator of the scale and inclosed in a light casing provided with means for effecting its attachment to the cylinder or casing of the scale, the usual hand or indicator of the scale serving as a rotating support for the dial and the latter serving to indicate the weight of the article or substance supported in the scale-pan and to automatically compute the value thereof.

The invention further consists in the peculiar construction of the dial, which renders its use in connection with previously-adjusted scales a practical possibility, inasmuch as it is evident that the dial must be of exceedingly light weight to prevent it from having any appreciable effect upon the adjustment of the scale; and a still further object of the invention is to provide a supplementary scale designed to be attached to the balance-plate of the scale and designed to move below the edge of the casing of the computing device for the purpose of indicating an excess of weight over that contemplated by a single rotation of the computing-dial.

The invention further consists in the construction and arrangement of parts to be hereinafter more fully described, illustrated in the accompanying drawings, and defined in the appended claims.

In said drawings, Figure 1 is a front elevation of a scale equipped with our computation attachment. Fig. 2 is a rear elevation thereof. Fig. 3 is a side elevation with the scale-pan and a portion of its bail removed. Fig. 4 is a sectional view of the subject-matter of Fig. 3. Fig. 5 is a view similar to Fig. 1, but showing the supplemental scale drawn down to indicate a weight of thirty pounds, which may or may not be an excess over the weight contemplated to be indicated by a single rotation of the dial. Fig. 6 is a sectional view similar to Fig. 4, but on a somewhat larger scale and showing the device equipped with the supplemental scale and with the preferred form of dial. Fig. 7 is a detail perspective view of the skeleton frame of the dial, and Fig. 8 is a detail view illustrating the construction and manner of attachment of the supplemental scale.

Referring to the numerals of reference employed to designate corresponding parts throughout the views, 1 indicates the casing of a scale, which in the accompanying drawings is illustrated as being of the spring-balance variety and comprehending a suitable suspending device 2, connected to the upper end of the casing, and a balance-plate 3, movably mounted in the casing and having its lower end extended therebelow for attachment to the supporting-link 4 of the scale-pan 5, provided with a bail 6, engaged by the link 4. As usual in this class of scales, the balance-plate 3 is sustained by a stout spring or other preferred form of weighing mechanism and is operatively connected to the arbor 7 of a pointer or indicator 8, designed to traverse a circular scale provided upon the face of the casing 1 for the purpose of indicating various weights in accordance with the position of the pointer or indicator. The aggroupment of elements recited comprehends the ordinary spring-balance scale, which is the form selected by us for illustration in connection with our computation attachment. This latter, which, as heretofore stated, is designed for attachment to the scale without special adaptation thereof, comprehends a circular casing comprising a disk 9, preferably of light metal, and a rim 10 at the periphery of the disk and provided at its opposite edge with a bezel 11, against which is seated the edge of a circular crystal or glass face-plate 12, rendered opaque, as by a paper backing 13, cut away at its periphery to form an arcuate sight-opening 14 and at any suitable point to form a radially-disposed sight-opening 15. The means for attaching the case thus constructed may be varied within wide limits, as our invention in its broadest aspect comprehends the attachability of the case to the scale-casing regardless of the particular means employed for effecting the connection.

The attaching means illustrated and considered at this time to be preferable consists in providing a pair of angular flanges 16 and 17, located at the opposite sides of an elongated opening 18 in the disk 9, the opening being designed for the reception of the scale-casing 1 and the flanges 16 and 17 being extended at right angles to the disk and in substantially parallel relation with each other for the support of clamping-screws 19, piercing the flanges, and provided upon their inner ends with rubber or other suitable frictional buffers 20, which are clamped against the casing 1 by turning up the screws 19 to effect the rigid attachment of the case to the scale-casing. The angular arrangement of the flanges is provided for the purpose of permitting the clamping-screws 19 to urge the buffers 20 against both the side and end faces of the casing for the purpose of preventing relative movement in any direction.

By reference to Figs. 2 and 4 of the drawings, as well as to Fig. 6, it will be noted that the case of the computing mechanism having been secured or attached to the casing 1 the face-plate of said casing and the indicator or hand 8 will be located within the case between the disk 9 and the crystal 12. It simply remains now to provide a dial bearing a weight-indicating scale and a computing-scale and equipped with means for effecting its attachment to the hand or indicator 8 for actuation by the latter. We therefore employ a computation-dial 21, upon the face of which is imprinted or otherwise affixed a circular weight-indicating scale 22, surrounding radiating series of price designations 23, bearing proper relation to the scale 22 and designed to be exposed before the sight-opening 15 and in juxtaposition to a price-per-pound scale 24 in accordance with a method of operation to be hereinafter more fully explained. At opposite sides of the arbor 7 the dial 21 is provided with dial-attaching devices or clamps 25, designed to be secured upon the indicator 8 adjacent to the arbor for the purpose of effecting a rotation of the dial as the arbor is turned under the impulse of the balance-plate 3 when the latter is drawn down by a weight imposed upon the scale-pan 5 or upon the element corresponding thereto in other forms of scales. It will now be seen that as the arbor of the scale is rotated in the usual manner under the impulse of the object or substance to be weighed the dial 21 will be rotated and the weight of the object will be determined by the advance of the scale 22 beyond the end of the sight-opening 14. (Indicated by the arrow in Fig. 1.) At the same time the rotation of the dial through that arc corresponding to each unit increase in weight will present a new series of price-indicating figures before the sight-opening 15 and in juxtaposition to the numbers indicating various prices per pound. For instance, as indicated in Fig. 1, ten pounds is indicated by the weight-indicating scale 22, and immediately below the numbers "5," "6," "7," "8," and "9," appearing on the crystal, are presented the numbers "50," "60," "70," "80," and "90," the significance of which is that the object or substance being weighed is of a total value of fifty, sixty, seventy, eighty, or ninety cents, accordingly as the price per pound is five, six, seven, eight, or nine cents.

The device as thus far described and as illustrated in the first four figures of the drawings comprehends a complete embodiment of our invention in its broadest aspect; but inasmuch as the attachment of any known form of dial to the delicately-poised indicator of a balance-scale would tend in greater or less degree to interfere with the accurate recording of weights we have devised a novel form of dial, which, while sufficiently stiff to prevent warping or distortion under ordinary conditions, will be so extremely light as to be capable of attachment to the indicator 8 without interfering with the adjustment of the scale. The dial as thus constructed comprehends a skeleton frame, preferably made of aluminium and composed of a thin metal disk 26, constituting a hub from which radiate any desired number of light spokes 29, carrying a small wire rim 30, said spokes being connected to the hub or disk in any suitable manner—as, for instance, by brazing or soldering or by stamping these parts of the frame from a single sheet of metal. At points upon opposite sides of its center the disk 26 is provided with the clamps or retaining devices 25, and over the skeleton frame thus constructed is drawn a thin facing 31 of paper, muslin, or other suitable material secured to the frame in any desired manner, but preferably by winding it snugly around the rim 30 and by utilizing the nuts 32 to retain the facing in close contact with the disk 28.

We have also devised a supplemental attachment made necessary by the application of our computation device to an ordinary scale. This attachment is embodied in a supplemental scale-plate 33, having its upper end bifurcated and provided with parallel flanges 34, disposed upon opposite sides of the rib 36 of the balance-plate 3 and secured to said rib by clamping-screws 37, carrying buffers 38. In spring-scales of usual construction the front face of the balance-plate 3 is provided with graduations designed to indicate weights exceeding the capacity of the scale over the face of which the indicator moves; but the attachment of our device obscures these graduations, and as this excess scale is a necessary feature of this class of weighing appliances we provide the supplemental scale-plate 33, arranged for attachment to the lower end of the plate 3 and bearing graduations exposed below the lower edge of the case of our computation mechanism and indicating weights in excess of that contemplated by the scale 22.

From the foregoing it will be observed that we have produced a simple, inexpensive, and thoroughly efficient computing attachment designed to be applied to scales now in use without reorganization or special adaptation of the latter; but while the present embodiment of the invention appears at this time to be preferable we do not wish to limit ourselves to the structural details defined, as it is obvious that many variations might be effected without departing from the spirit of the invention. For instance, instead of employing a paper backing to render the crystal 12 opaque said crystal might be colored or otherwise obscured except at the sight-openings 14 and 15. Various attaching devices might be employed for effecting the attachment of the dial to the indicator, and various modes of effecting the ready attachment of the entire case to the scale-casing other than the special form of flanges and clamping-screws shown might be originated and utilized by individual manufacturers. We therefore reserve the right to effect such changes, modifications, and variations of both form and arrangement as may be comprehended within the scope of the protection prayed.

What we claim as new, and desire to secure by Letters Patent, is—

1. The combination with a weighing-scale comprising a casing and a rotary indicator, of a computing attachment comprising a case having a series of adjustable clamps for effecting the attachment of the case to the scale-casing, a computing-dial within the casing, and coupling devices carried by the dial and connected to the indicator at opposite sides of its axis.

2. The combination with a weighing-scale comprising a casing and a rotary indicator, of a computing attachment comprising a case having an opening in its back for the reception of the scale-casing and flanges extending along opposite sides thereof, adjustable clamps carried by the flanges and bearing against the casing, a computing-dial within the casing and adjustable clamping devices carried by the dial and engaging the indicator at opposite sides of its axis.

3. The combination with a weighing-scale comprising a casing, a rotary indicator and a balance-plate, of a case detachably carried by the scale-casing, a computing-dial within the case and carried by the indicator, and a supplemental scale detachably carried by the balance-plate and depending below the case to indicate weights in excess of the capacity of the dial and adjustable clamps for effecting the attachment of the supplemental scale to the plate.

4. A computing-dial designed for attachment to an ordinary weighing-scale without disorganization or special adaptation of the latter, said dial comprising a small light metal disk, a series of spokes radiating from said disk, a light rim connecting the outer ends of the spokes, a facing stretched over the frame thus formed, and a pair of coupling devices extending laterally from the small metal disk adjacent to and parallel with the axis thereof, whereby said dial may be readily coupled directly and rigidly to the indicator of an ordinary weighing-scale at opposite sides of the scale-shaft and immediately adjacent thereto.

5. The combination with a weighing-scale comprising a casing and an indicator, of a computing attachment comprising a case having an open back for the reception of the scale-casing, means for detachably connecting the attachment-case to the scale-casing, a computing-dial within the case, and an attaching device for detachably connecting the dial directly to the indicator of the scale whereby the attachment may be mounted for use upon an ordinary weighing-scale without disorganization or special adaptation of the latter.

6. The combination with a weighing-scale comprising a casing and an indicator, of a computing attachment comprising a casing having an open back for the reception of the casing, adjustable clamps carried at the back of the case for engagement with the scale-casing, a computing-dial within the case, and adjustable clamps carried by the dial and engaging the indicator at opposite sides of its axis.

In testimony that we claim the foregoing as our own we have hereto affixed our signatures in the presence of two witnesses.

HARRY B. McNULTY.
BENJAMIN L. McNULTY.

Witnesses for H. B. McNulty:
CHAPMAN W. FOWLER,
D. P. WOLHAUPTER.
Witnesses for B. L. McNulty:
LOUIS G. JULIHN,
C. A. NEALE.